N. JACKSON.
Construction of Canal-Boats.
No. 148,957.                          Patented March 24, 1874.
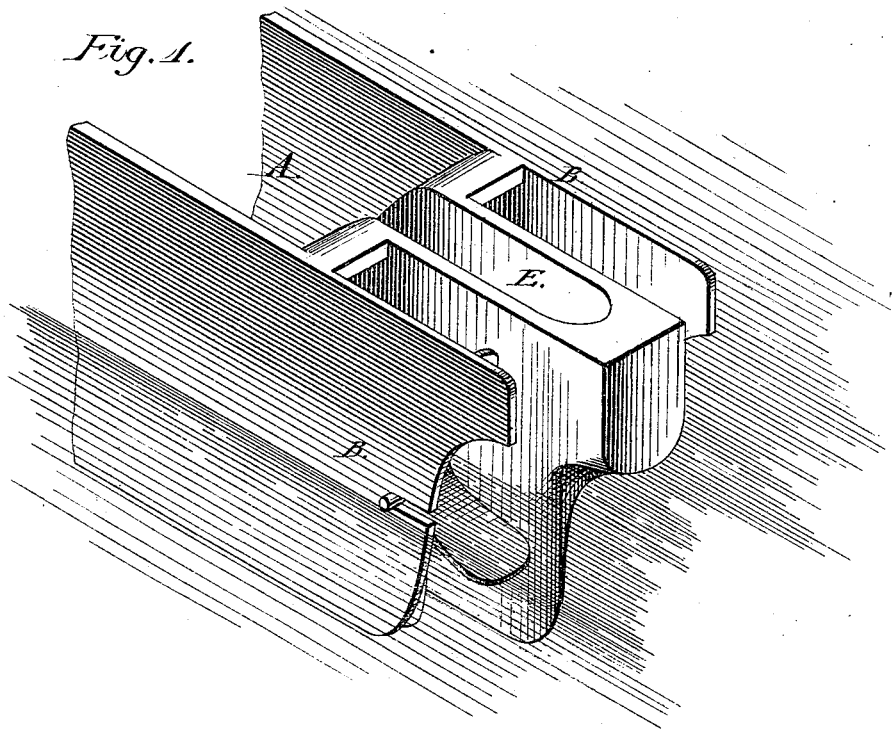
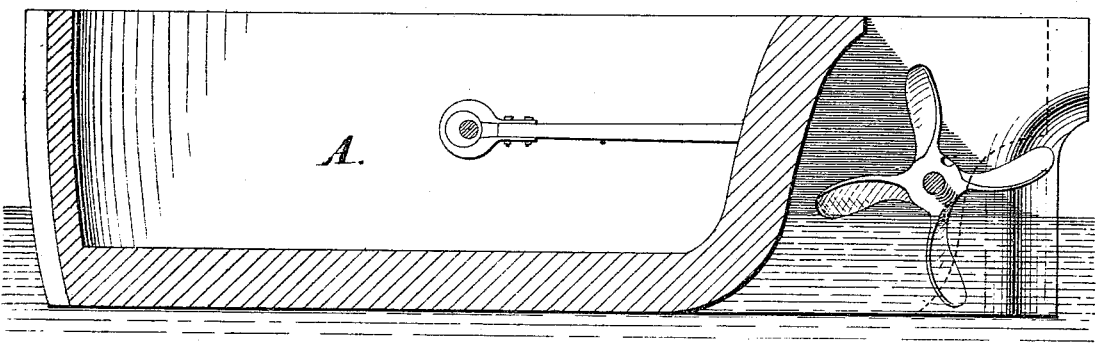
Attest:
Wm Wurton
Geo. T. Gibbons
Inventor:
Noble Jackson

UNITED STATES PATENT OFFICE.

NOBLE JACKSON, OF HIGGINSVILLE, NEW YORK.

IMPROVEMENT IN CONSTRUCTION OF CANAL-BOATS.

Specification forming part of Letters Patent No. 148,957, dated March 24, 1874; application filed October 9, 1873.

*To all whom it may concern:*

Be it known that I, NOBLE JACKSON, of Higginsville, county of Oneida, State of New York, have invented certain new and useful Improvements in Canal-Boat; and I do declare the following to be a full and clear description of the same, reference being had to the accompanying drawing, in which—

Figure 1 represents a plan view, and Fig. 2 a side view, of the canal-boat; and Fig. 3, an end view of the propeller-wheel.

A represents the body of a vessel designated as a canal-boat. The sides B project backward at the stern, and downward to the lower plane of the bottom of the vessel. The lower portions of the rear ends of the projecting sides are cut away, as shown at G. These projections afford outer bearings for the journals of the wheels, protect the wheels from the banks, and permit the water to escape from the wheel at the cut-away part G to the sides and rear. The central rear portion E of the boat projects backward between the projecting sides, and is adapted to receive the propelling machinery, so as not to interfere with the cargo-space, and to afford inner bearings for the wheels. Between the projecting sides B and the projecting part E recesses are formed, in which the wheels are placed. These recesses also serve to confine the water as it rises from beneath the boat, and thus render the operation of the wheels more effective. The propelling-wheels C are formed so as to present right and left wing-paddles to deflect the water laterally and rearwardly.

The pitch and the level of the blades of the wheels may be varied without deviating from the principle of my invention.

The wheels may be placed upon a single shaft, with single or double cranks, or upon separate shafts, so as to be revolved in opposite directions.

The power to be used, and the manner of applying it, may be varied, as occasion may require.

What I claim is—

A canal-boat having a rear projecting central space, adapted to receive the propelling machinery, and having the sides projecting rearwardly and downwardly to the plane of the bottom of the vessel, and cut away at the lower after portion, forming channels to confine the water, so as to offer a greater resistance to the wheels, the inclined blades of which may deflect the water sidewise and rearwardly, all constructed and combined substantially as and for the purpose set forth.

NOBLE JACKSON.

Witnesses:
WM. MARTIN,
GEO. T. GIBBONS.